US012330846B2

(12) United States Patent
Green

(10) Patent No.: US 12,330,846 B2
(45) Date of Patent: Jun. 17, 2025

(54) STORAGE CONTAINER WITH LID DOLLY

(71) Applicant: Jeff Green, Beverly Hills, CA (US)

(72) Inventor: Jeff Green, Beverly Hills, CA (US)

(73) Assignee: The Merchant of Tennis, Inc., Beverly Hills, CA (US)

( * ) Notice: Subject to any disclaimer, the term of this patent is extended or adjusted under 35 U.S.C. 154(b) by 0 days.

(21) Appl. No.: 16/942,576

(22) Filed: Jul. 29, 2020

(65) Prior Publication Data
US 2022/0033151 A1 Feb. 3, 2022

(51) Int. Cl.
*B65D 51/24* (2006.01)
*B62B 3/02* (2006.01)
*B65D 21/02* (2006.01)

(52) U.S. Cl.
CPC ............... *B65D 51/24* (2013.01); *B62B 3/02* (2013.01); *B65D 21/0219* (2013.01); *B62B 2205/10* (2013.01); *B65D 2543/00194* (2013.01)

(58) Field of Classification Search
CPC ....... Y10T 16/18; B62B 3/02; B62B 2205/10; B62B 3/004; B65D 21/0219
See application file for complete search history.

(56) References Cited

U.S. PATENT DOCUMENTS

| 3,376,046 | A | * | 4/1968 | Kivett | B62B 1/10 206/508 |
| 5,564,805 | A | | 10/1996 | Dickinson | |
| 5,709,008 | A | | 1/1998 | Dickinson | |
| 5,947,273 | A | * | 9/1999 | Dalrymple | B65D 71/0022 206/176 |
| 6,199,879 | B1 | | 3/2001 | Cino et al. | |
| 6,983,946 | B2 | | 1/2006 | Sullivan et al. | |
| 7,146,683 | B1 | * | 12/2006 | Willis | B60B 33/0028 16/31 R |
| 7,350,789 | B2 | * | 4/2008 | Uffner | B60B 33/08 280/33.998 |
| 7,364,172 | B1 | * | 4/2008 | Archer | B62B 3/104 280/79.5 |
| 8,132,819 | B2 | | 3/2012 | Landau et al. | |
| 8,714,568 | B2 | * | 5/2014 | Allam | B65D 21/0233 280/30 |
| 9,630,638 | B1 | * | 4/2017 | DeLuca | B60K 1/00 |
| 9,707,802 | B1 | * | 7/2017 | Abbassi | B60B 33/0013 |
| 9,757,980 | B1 | * | 9/2017 | Jones | B60B 33/04 |

(Continued)

OTHER PUBLICATIONS

ATEM Offroad, 5 Minute DIY How to Installing Caster Wheels on a Shop Work Bench Table Amazon's ENJUCOM 4 Casters, May 2, 2020, Youtube, https://www.youtube.com/watch?v=ssx-R_BzK9I (Year: 2020).*

*Primary Examiner* — Ernesto A Grano
*Assistant Examiner* — Symren K Sanghera
(74) *Attorney, Agent, or Firm* — FROST BROWN TODD LLP

(57) ABSTRACT

A storage device has a container and a lid dolly that is usable as a lid to close the container and as a dolly to transport the container, wherein the lid dolly has casters configured to fit within the interior of the container when the lid dolly is closed on the container. A storage device kit has a container, a lid, a template, casters and fasteners. A retrofit kit for a storage device with a container and a lid has a template, casters and fasteners. The template may be installed as a reinforcement plate to structurally reinforce the lid for supporting the weight load of the container and its contents.

12 Claims, 10 Drawing Sheets

(56) References Cited

U.S. PATENT DOCUMENTS

| | | |
|---|---|---|
| 9,834,335 B1 | 12/2017 | Summers |
| 11,059,631 B1* | 7/2021 | Brunner .............. B65D 21/0217 |
| 2001/0050517 A1* | 12/2001 | Spitzer ................... A47B 57/06 |
| | | 312/249.8 |
| 2002/0125665 A1* | 9/2002 | Cohen ...................... A45C 5/14 |
| | | 280/35 |
| 2004/0232034 A1* | 11/2004 | Lebras ................... B65D 5/245 |
| | | 206/557 |
| 2006/0186622 A1* | 8/2006 | Darling, III ............ B62B 13/18 |
| | | 280/35 |
| 2010/0065556 A1* | 3/2010 | Cole .................... H05B 6/6494 |
| | | 219/730 |
| 2010/0187848 A1* | 7/2010 | Kapoor .................... A61G 1/06 |
| | | 248/351 |
| 2011/0084121 A1* | 4/2011 | Sanders ............... B65D 5/6658 |
| | | 229/128 |
| 2011/0253772 A1* | 10/2011 | Holch ................. B65D 5/0005 |
| | | 229/101.2 |
| 2012/0235372 A1* | 9/2012 | Herlitz ..................... B62B 9/20 |
| | | 280/47.38 |
| 2012/0248722 A1* | 10/2012 | Herlitz .................... B62B 3/007 |
| | | 53/473 |
| 2013/0112742 A1* | 5/2013 | D'Amato ................. B65D 5/42 |
| | | 229/222 |
| 2013/0341386 A1* | 12/2013 | Hubbard, Jr. ........ B65D 5/2057 |
| | | 229/150 |
| 2014/0138180 A1* | 5/2014 | Moore ...................... G10G 5/00 |
| | | 181/285 |
| 2014/0332584 A1* | 11/2014 | Cook ..................... B65D 5/667 |
| | | 493/63 |
| 2016/0251108 A1* | 9/2016 | Gungner ................. B31B 50/81 |
| | | 229/125.36 |
| 2018/0022544 A1* | 1/2018 | Donnelly .............. B65F 1/1468 |
| | | 220/605 |
| 2018/0345121 A1* | 12/2018 | Goehring, Jr. .......... B32B 29/02 |
| 2019/0217915 A1* | 7/2019 | Clos ....................... B62K 21/10 |
| 2020/0269894 A1* | 8/2020 | Cohen ...................... B62B 3/04 |
| 2021/0031975 A1* | 2/2021 | Brunner .................. B25H 3/021 |
| 2021/0163050 A1* | 6/2021 | Chang ...................... B62B 5/02 |
| 2021/0206413 A1* | 7/2021 | Candelario ............. B62B 3/022 |
| 2021/0394557 A1* | 12/2021 | Hecht Olsen ....... B60B 33/0049 |

* cited by examiner

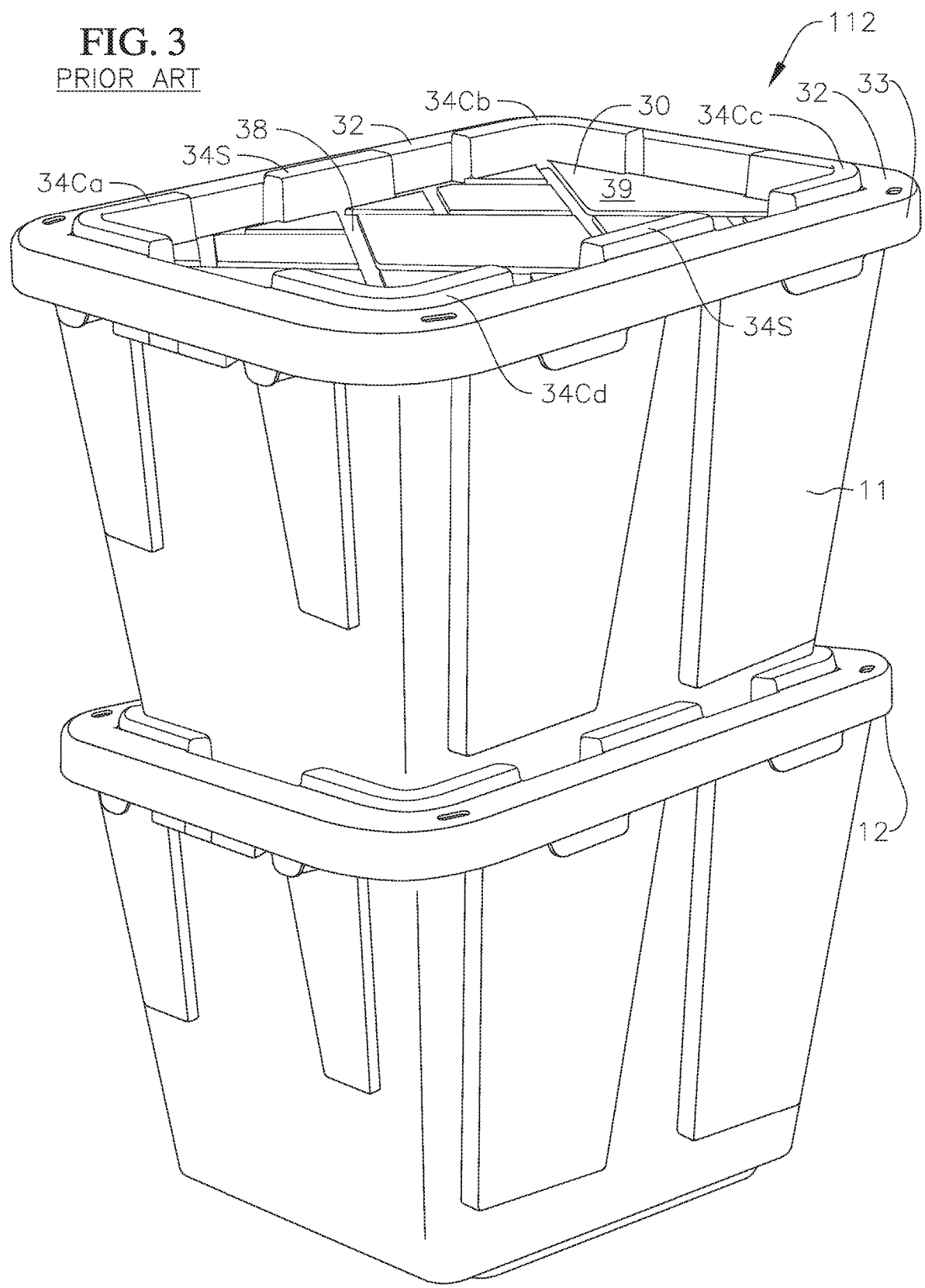

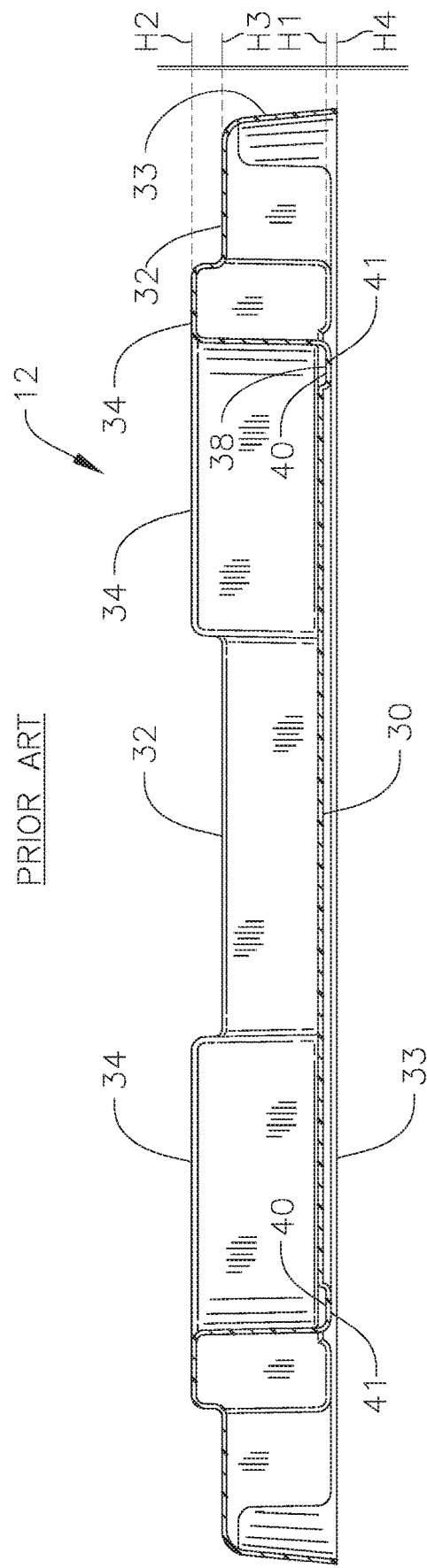

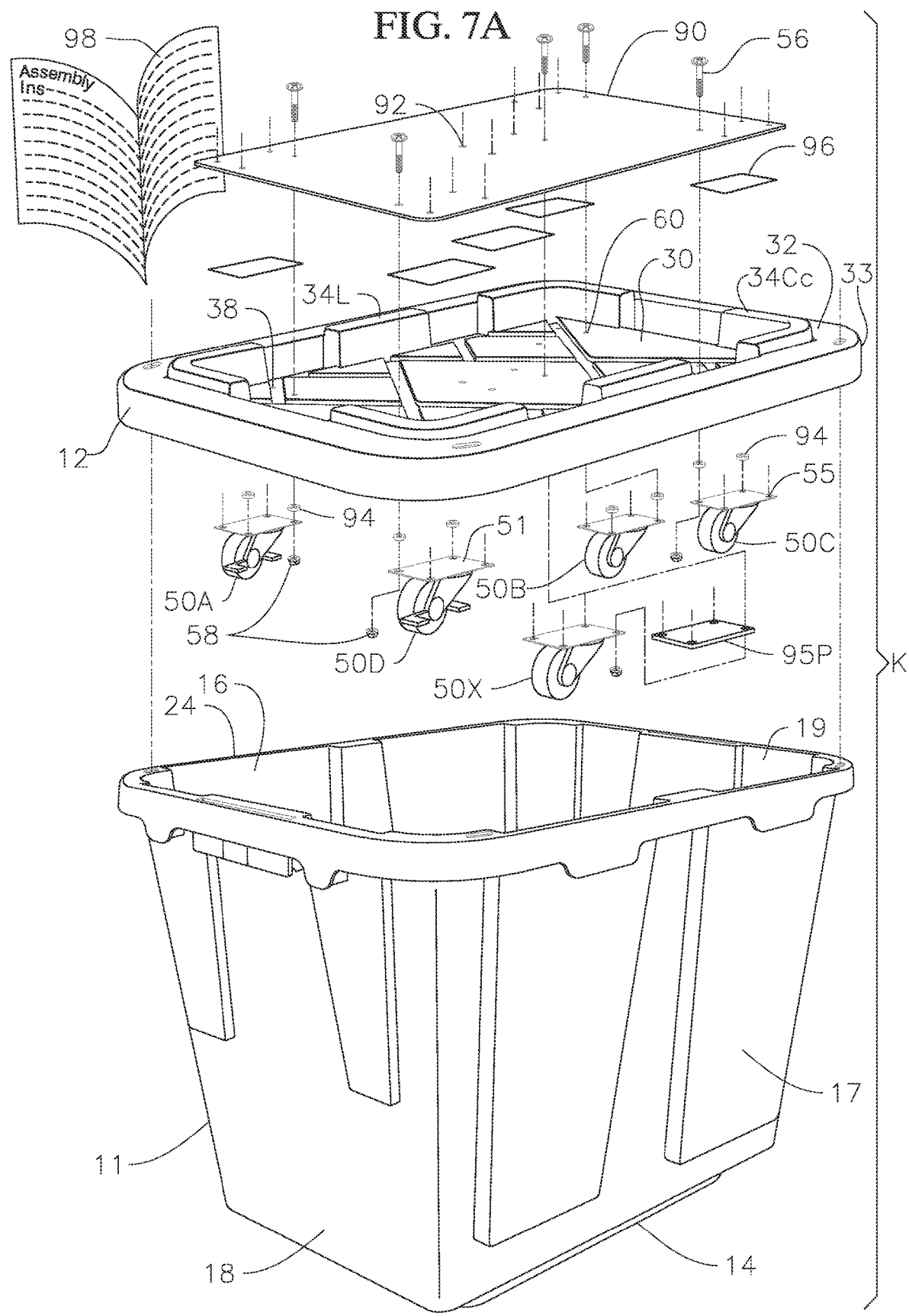

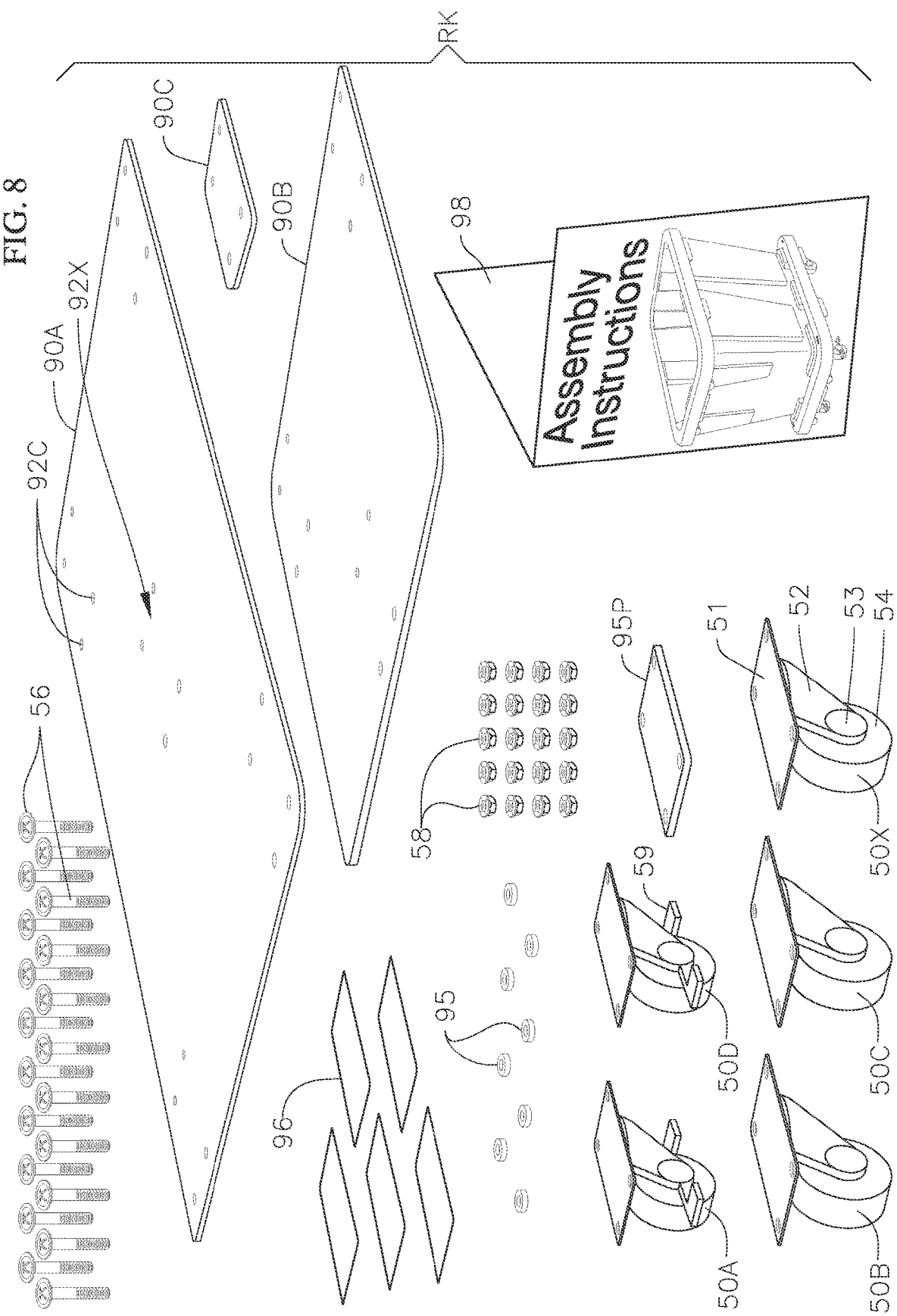

STORAGE CONTAINER WITH LID DOLLY

BACKGROUND

1. Field

Some embodiments of the present disclosure relate to storage, in particular, portable storage containers with detachable lids.

2. Description of the Related Art

Recent research reports that hoarding, or at least the habit to store and keep, is on the rise. Consumers have a tendency to hold on to merchandise, including outdated clothing and shoes, books and old electronics, and seasonal items such as winter wear and holiday decorations. Many believe these items will be used again in the future and will store these items even despite arguments with family members or roommates. Some surveys have shown that nearly half of all residents experience panic, anxiety or stress at the thought of a guest seeing the clutter in their homes and the clutter may be transferred to a closet, a spare bedroom, the attic or the basement.

It is not surprising that storage unit complexes have also become popular. Self-service storage has become an industry in the United States. As of 2018, the number of storage facilities in the United States is estimated to range between 44,000 and 52,000. Death, divorce, downsizing and dislocation are believed to be main factors driving the need or desire for storage space rental.

Whether storing, decluttering or relocating, storage containers or storage bins have a role to play. Multiple storage containers are often used and stored together such that the owner may need to move multiple heavy containers. Transport dollies may be used but dollies may not be available or otherwise handy to use. Moreover, transporting stacked containers on a dolly can be tricky without bungee cords or straps to tie down or otherwise help secure the containers on the dolly.

Accordingly, there is a need for a storage container that includes a lid that be configured as dolly and a kit that can convert an existing storage container lid with dolly features.

The above information is only for enhancement of understanding of the background of embodiments of the present disclosure, and therefore may contain information that does not form the prior art.

SUMMARY

In some embodiments, a storage device has a container having an opening to an interior volume defined by a bottom, and side walls having upper edges that surround the opening of the interior volume; a lid dolly having a main portion, a raised peripheral portion, and a plurality of stabilizers; and a plurality of casters fastened to the main portion of the lid dolly, wherein the casters are disposed inside of the upper edges when the lid dolly is on the container enclosing the interior volume with the peripheral portion releasable engaged with the upper edges of the container, and wherein the stabilizers are configured to releasably position the bottom of the container on the lid dolly when the container is positioned on the lid dolly.

In some embodiments, the plurality of stabilizers includes a corner stabilizer.

In some embodiments, the plurality of stabilizers includes a linear stabilizer.

In some embodiments, the casters include spinner casters.

In some embodiments, the casters include non-spinner casters.

In some embodiments, the lid dolly has an outer surface and an inner surface, and the casters are fastened to the inner surface of the lid dolly.

In some embodiments, the storage device includes a reinforcement plate fastened to the lid dolly.

In some embodiments, the reinforcement plate is positioned between the lid and the casters.

In some embodiments, the storage device includes fasteners extending through the main portion of the lid dolly and the reinforcement plate.

In some embodiments, the storage device includes fasteners extending through the main portion of the lid dolly and a top plate of each caster.

In some embodiments, the storage device includes shims between the main portion and the casters.

In some embodiments, a storage device kit includes a container having an opening to an interior volume defined by a bottom, and side walls, the side walls having upper edges that surround the opening of the interior volume; a lid having a main portion and a raised peripheral portion; a plurality of casters configured for attachment to the main portion of the lid; a plurality of fasteners configured to attach the casters to the lid; and a template having markers to indicate attachment position of each caster on the lid, wherein the casters are configured to be disposed inside of the upper edges of the container when the lid dolly is on the container with the peripheral portion releasably engaged with the upper edges of the container.

In some embodiments, the storage device kit includes a plurality of stabilizers, wherein the stabilizers are configured to releasably secure the bottom of the container when the container is on the lid dolly.

In some embodiments, the fasteners include adhesive.

In some embodiments, the fasteners include bolts and nuts.

In some embodiments, the bolts extend through the main portion of the lid and top plates of the casters.

In some embodiments, the casters include spinner casters and nonspinner casters, and any plurality of casters may be used, e.g., three to nine or more.

In some embodiments, the markers include spinner caster markers and nonspinner caster markers.

In some embodiments, a retrofit kit for a storage device with a lid and a container, has a plurality of casters, each with a respective wheel and a respective top plate, the top plate configured for attachment to the lid; a template configured for placement against the lid, the template having markers for indicating attachment positions of the casters to the lid; and a plurality of fasteners configured to fasten together the lid and the respective top plate of each caster.

In some embodiments, the retrofit kit includes a plurality of shims configured for placement between the top plate of each caster to the lid.

In some embodiments, the casters include spinner casters and nonspinner casters, and any plurality of casters may be used, e.g., three to nine or more.

BRIEF DESCRIPTION OF THE DRAWINGS

Some embodiments can be understood in more detail from the following description taken in conjunction with the accompanying drawings, in which:

FIG. 3 is a perspective view of lidded storage containers in a stacked configuration.

FIG. 4 is an end cross-sectional view of the lid of FIG. 1.

FIG. 7A is an exploded perspective view of a storage device kit, according to an embodiment of the present invention.

FIG. 8 is a perspective view of a retrofit kit for a storage device, according to an embodiment of the present invention.

DETAILED DESCRIPTION

Figure 1:
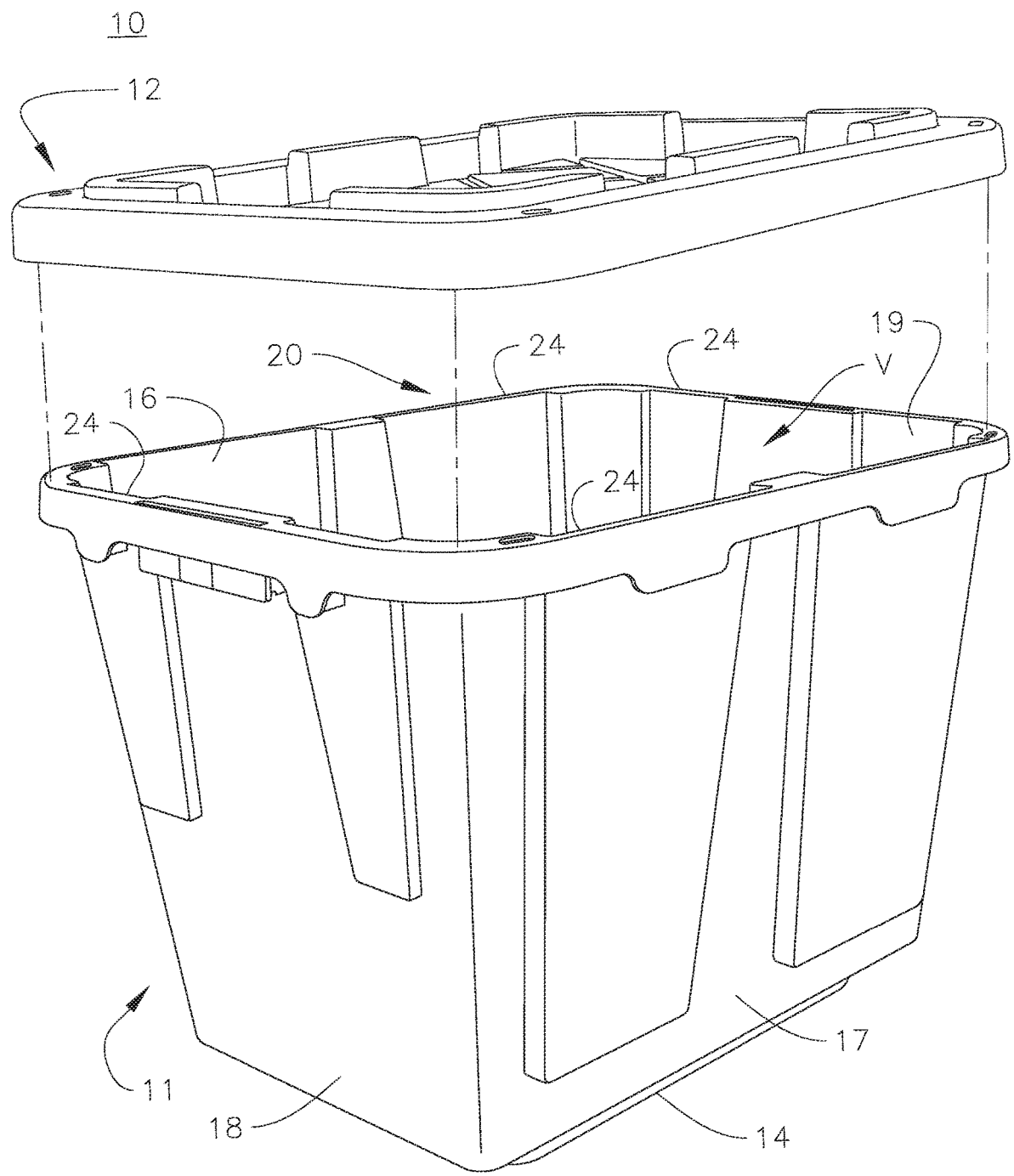
FIG. 1 is an exploded perspective view of a storage container and lid.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. The drawings are not necessarily to and the relative sizes of elements, layers, and regions shown may be exaggerated for clarity.

Embodiments of the present disclosure as shown in FIG. 1 include a storage device 10 having a container (or bin) 11 and a lid 12, either or both of which may be constructed of injection-molded plastic, as known in the art. Suitable construction materials include, for example, polypropylene (PP) and high-density polyethylene (HDPE). The storage container 11 has an interior volume V configured to receive for storage and safe-keeping a variety of items which may be placed inside the container 11 by a user and protected, especially when enclosed in the interior volume by the lid 12. The storage container has a bottom 14, first and second side walls 16 and 17, and first and second end walls 18 and 19, which together define the interior volume V. Upper edge 24 of the walls 16, 17, 18 and 19 define an opening 20 into the interior volume V that is sealed by the lid 12 when placed on and releasably engaged with the upper edges 24 of the walls 16, 17, 18 and 19. It is understood that the construction material of the container and the lid are elastically flexible so that the user can snap the lid onto the container and snap the lid off from the container.

Figure 2:
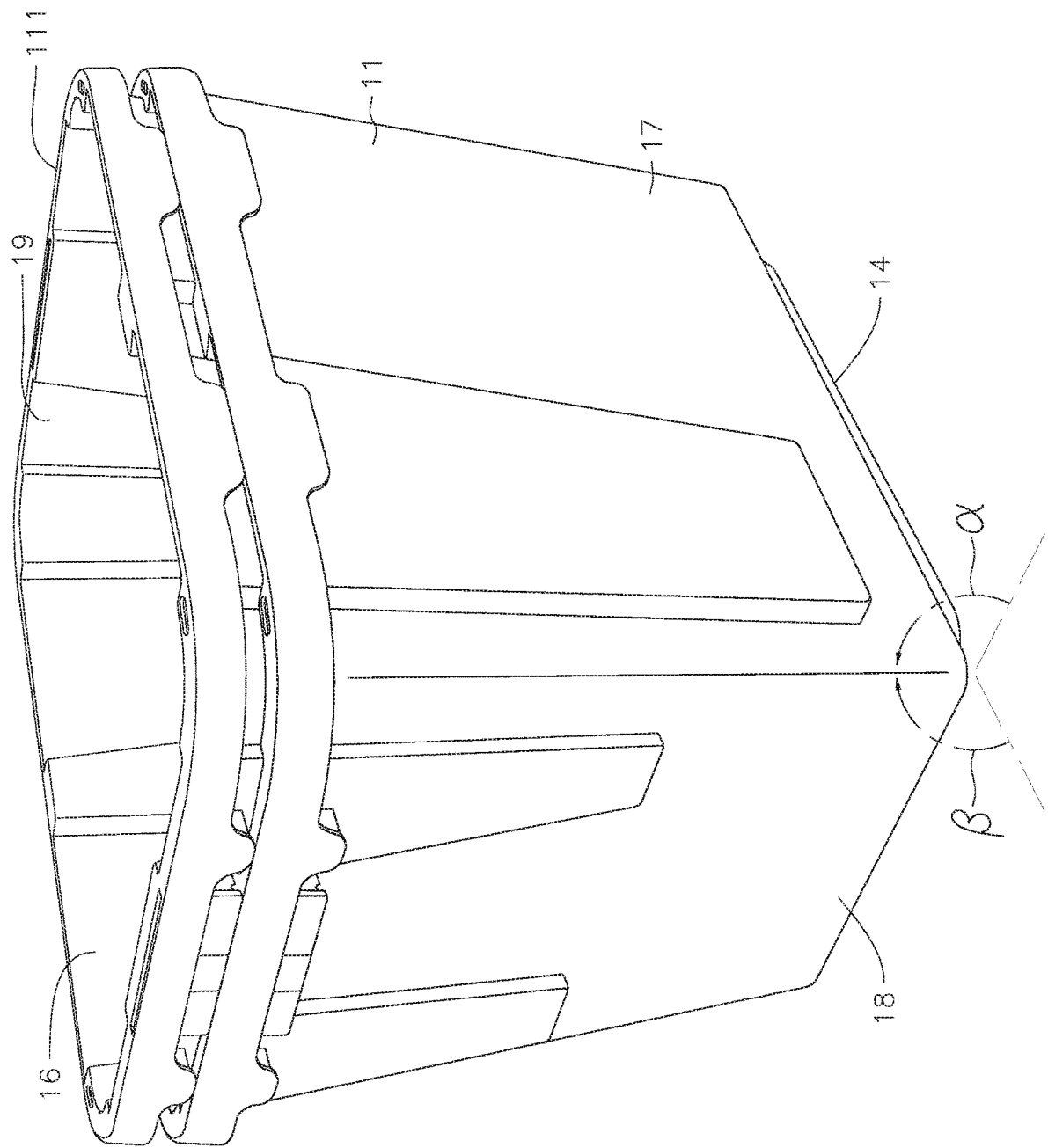
FIG. 2 is a perspective view of nesting containers.

In some embodiments, the container 11 is configured to nest within a second empty container 111 of generally identical or similar configuration, as shown in FIG. 2.

Nesting the containers 10 and 100 efficiently minimizes the occupation of space by the two containers when empty and not in use. In that regard, the walls 16, 17, 18 and 19 are arranged to extend at predetermined angles α and β at less than 90 degrees from the horizontal axes so that the walls slant outwardly, resulting in the bottom 14 defining a smaller area relative to a larger area defined by the opening 20 and the lid 12.

In some embodiments, the containers 11 and 111 when closed with respective lids 12 and 112 are configured to be conveniently stackable with an upper container supported on top of the lid of a lower container, as shown in FIG. 3.

In some embodiments, as seen in FIG. 3 and FIG. 4, the lids 12 and 112 have a generally uniform thickness although it is configured with portions at different relative elevations, including a main, generally planar horizontal portion 30 that spans at a lower elevation, a raised outer peripheral portion 32 at a mid-elevation with a hanging vertical lip 33 that is generally transverse to the peripheral portion 32, and a plurality of raised stabilizers 34 that intermittently extend at a higher elevation between the portions 30 and 32. As such, the lid in a side elevational view of FIG. 4 presents the main portion 30 at height H1, with an upper surface of the stabilizers 34 at height H2 farthest from the ground G, an upper surface of the peripheral portion 32 at height H3 that is between the heights H1 and H2, and a bottom edge of the hanging lip 33 at height H4 that is about equal, adjacent and/or comparable to the height H1.

The undersides of the peripheral portion 32 and the lip 33 of the lid are configured to releasably engage with the upper edge 24 (see FIG. 1) of the container walls 16, 17, 18 and 19 in closing and sealing the interior volume V of the container 11. As also shown in FIG. 3, the raised stabilizers 34 formed on an outerside or upperside of the lid 12 include linear or side stabilizers 34S and "L"-shaped or corner stabilizers 34Ca, 34Cb, 34Cc and 34Cd that contact and releasably secure the bottom of a container stacked on top of the lid.

In some embodiments, the main portion 30 is configured with grooves 38 in an otherwise generally planar body, to reinforce the lid 12 and improve its structural integrity. As shown in FIG. 3 and FIG. 4, the grooves 38 may be configured as recessed channels 40 on the upperside of the lid and raised ridges 41 on the underside of the lid. The grooves 38 may be configured in a pattern defining areas 39 with smooth and even surfaces between the grooves.

Figure 5A:
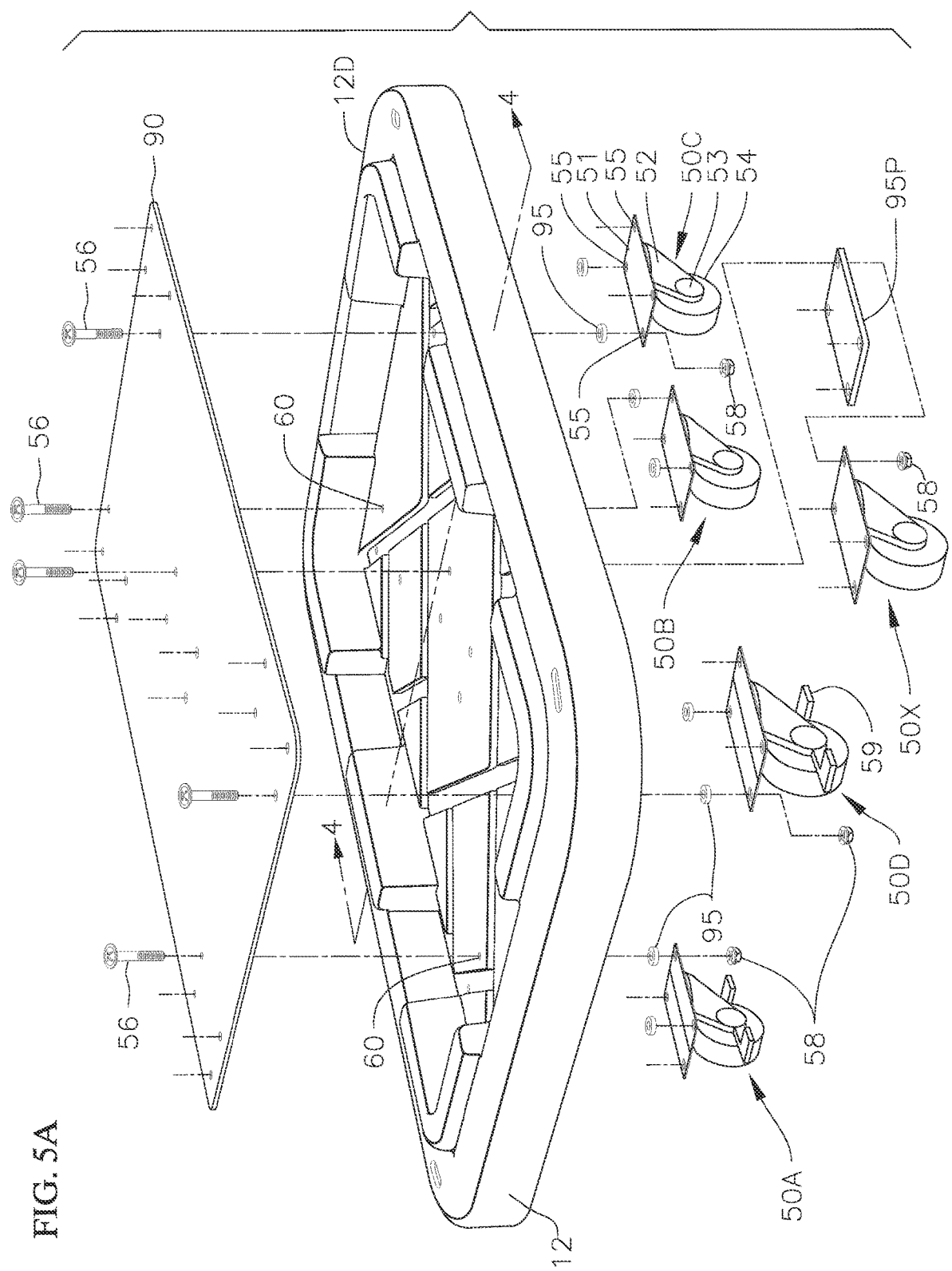
FIG. 5A is an exploded view of a lid dolly, according to an embodiment of the present invention.

Advantageously, the lid 12 is configurable into a lid dolly 12D (or dolly lid, used interchangeably herein) having a plurality of casters 50 extending from the underside of the lid, as shown in FIG. 5A. In some embodiments, casters 50A, 50B, 50C and 50D are positioned in respective corner regions of the lid dolly. In some embodiments, an additional caster 50X is positioned in or near a center of the lid dolly.

In some embodiments, each caster has a top plate 51, a fork 52, an axle 53 and a wheel 54. The fork 52 may be fixed to the top plate, or it may be spinnable about a vertical axis of the caster. Each top plate 51 is configured with a plurality of holes 55 through which bolts 56 are inserted to mount each caster to the underside of the main portion 30 of the lid and fastened with respective nuts 58 on the upperside of the main portion 30. In some embodiments, at least two casters are spinnable (e.g., casters 50A and 50D at one end) and at least two casters are not spinnable (e.g.,casters 50B and 50C at the opposite end). In some embodiments, at least some of the casters have brake locks 59 (e.g., casters 50A and 50D). Any plurality of casters may be used, as desired.

Figure 5B:
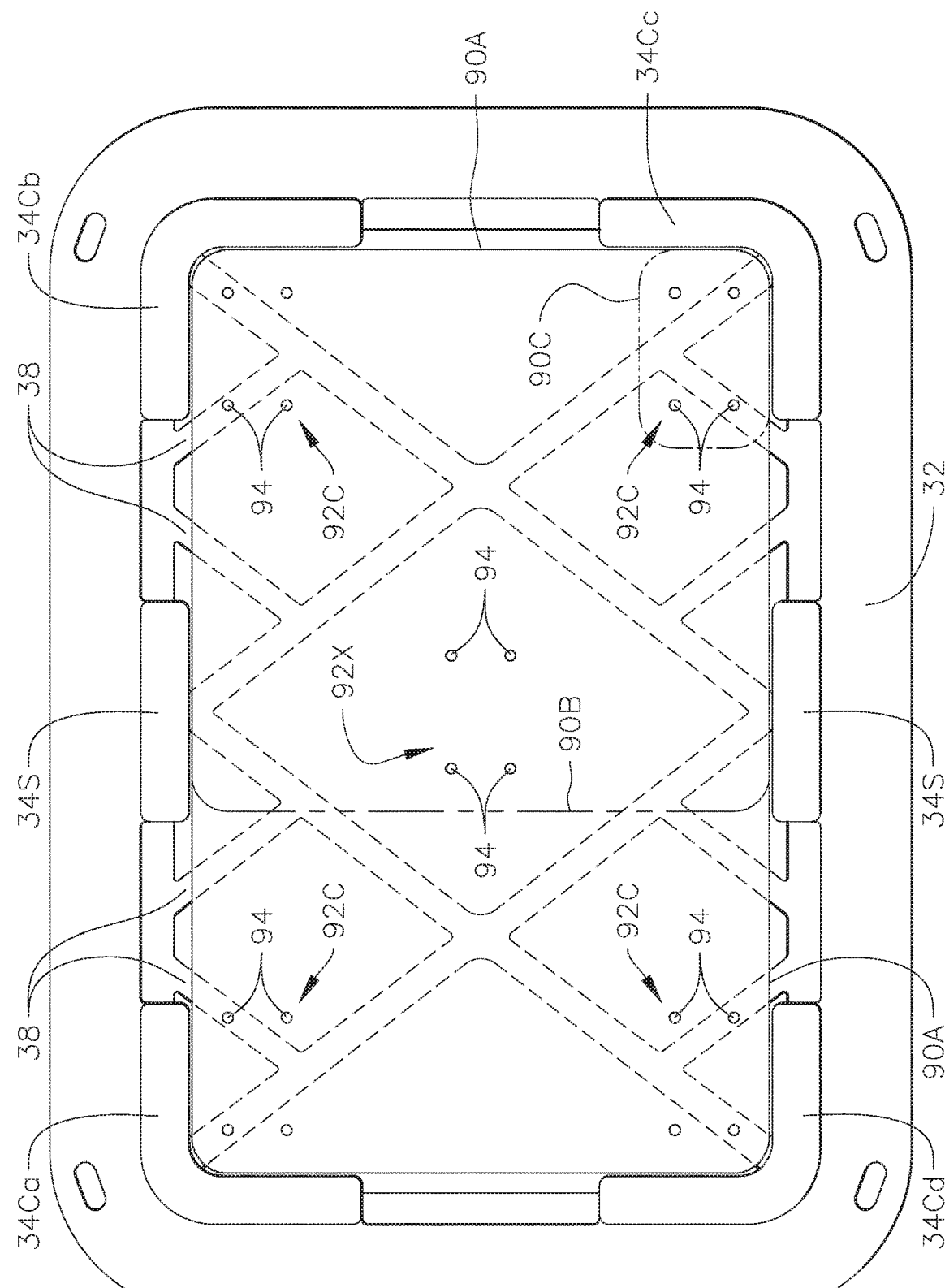
FIG. 5B is a top plan view of a template on a lid dolly, according to an embodiment of the present invention.

A plurality of corresponding holes 60 are formed in the lid to receive the bolts 56 that are inserted through the holes 60 of the lid and the holes 55 of the top plates 51. In that regard, a template 90 with markers 92, as shown in FIG. 5A, is provided for a user to locate suggested positions of the holes 60 to be drilled or otherwise formed in the lid by the user. In some embodiments, the template 90A (or large-size template) is configured to span and fit fully within the stabilizers 34 of the lid 12, lengthwise and widthwise, as shown in FIG. 5A and FIG. 5B. The template 90A includes a respective marker 92 for every hole 60, including corner markers 92C and center markers 92X. The template may be constructed of any suitable sheet material, including the same material as the lid or either, e.g., paper, cardboard, or plastic. The markers 92 may be any suitable visual indicia (e.g., "X" markings) or a through-hole 94 formed in the template. In some embodiments, the template is configured to fit in one or two adjacent corner portions of lid.

In some embodiments, as shown in FIG. 5B, template 90B (or mid-size template) extends between adjacent corner stabilizers 34Ca and 34Cb, with corner markers 92C and a center marker 92X. In some embodiments, as also shown in FIG. 5B, template 90C (or small-size template) is configured to fit with one corner stabilizer 34Cc with a corner marker 92C.

In some embodiments, the template 90 is configured such that the markers 92 or through-holes 94 are positioned to correspond within the flat areas 39 of the generally planar main portion 30 of the lid 12, between the grooves 38, so that the top plate holes 60 of all casters 50 are in a flat area 39 and all casters can be mounted at the same elevation relative to the lid 12. In some embodiments, the markers 92 or through-holes 94 position some holes 60 to be in the grooves 38 and other holes 55 to be in the flat areas 39, as shown in FIG. 5B. In some embodiments, perhaps users select their own positions for the holes 60 which may fall inside and outside of the grooves 38. In any of those cases where the holes 60 are not all uniformly formed at a uniform height with respect to the lid, such as where the holes 60 are not all uniformly formed in a groove 38 or not all uniformly formed in a flat area 39, one or more shims 95 may be used. In the embodiment of FIG. 5A, shims 95 are inserted on the relevant bolts 56 (including those bolts 56 inserted through a hole 60 in a flat area 39) between the top plate 51 of relevant casters and the underside of the lid 12 to adjust the elevation of the casters. In some embodiments, the shims are washer-type devices with a through-hole to receive the bolts 56. The shims may also include a plate-type device 95P configured to receive multiple bolts 56 for any particular caster, such as center caster 50X.

The template 90 may also include visual indicia or markers 92 and/or instructions that distinguish between different mounting positions for spinner casters 50A, 50D and nonspinner casters 50B, 50C. In some embodiments, the templates have one type of markers identifying the mounting positions of spinner casters 50A, 50D and another type of markers identifying the mounting positions of nonspinner casters 50B, 50C. In some embodiments, the templates are configured to instruct the user to mount two spinner casters on one end of the lid dolly as the lead/pull end, and two nonspinner casters on the opposite end of the lid as the trailing/push end for easier steering and manuevering of the lid dolly.

In some embodiments, the template 90 has adhesive, whether as a pre-applied coating or as user-applied double-sided sticky tapes, whether for temporary or permanent affixation on to the upperside (outside) or lowerside (inside) of the main portion 30, to facilitate the user drilling or otherwise forming the holes 60 in the lid according to the markers 92 or through-holes 94 of the template. Moreover, the template may be permanently affixed to the lid by the bolts 56 and/or adhesive as a reinforcement plate for the lid dolly in providing structural integrity for supporting the load of the container and its contents.

Figure 6:
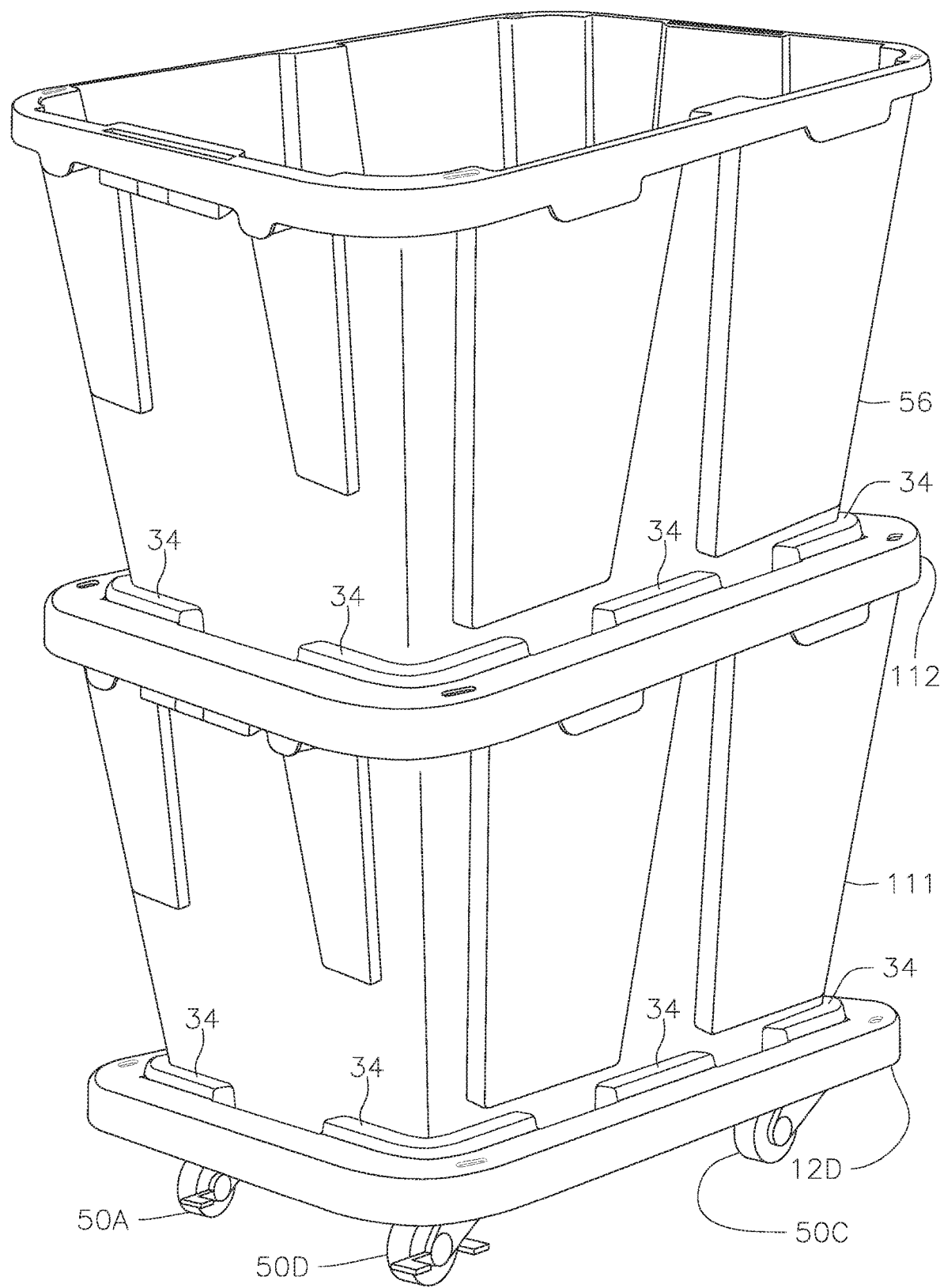
FIG. 6 is a perspective view of stacked storage devices supported on a lid dolly, according to an embodiment of the present invention.

With the casters 50 mounted, the lid is transformed into the lid dolly 12D onto which the storage container 11 can be placed and moved about by the user pushing the lid dolly and/or the storage container to roll the lid dolly, as shown in FIG. 6. The storage container 11 is reliably lodged on the lid dolly 12D between the stabilizers 34 which minimize the risk of the container 10 from slipping off the lid dolly 12D especially when the user is moving the storage device by pulling or pushing the container instead of pulling or pushing the lid dolly. Notably, with the main portion 30 of the lid dolly being closest to the ground G at height H1 (with possibly the sole exception of the lower edge of the vertical lip 33 which has a comparable height H4 in some embodiments), the entirety of the lid dolly is aptly elevated from the ground when the casters are mounted onto the main portion 30 so that no portions of the lid can drag, scrape or otherwise contact the ground when the lid dolly is rolled on the casters along the ground or a surface. In fact, so long as the total height of the casters is greater than the difference by which H1 is above H4 (see FIG. 4), no portion of the lid contacts the ground or surface.

Figure 7B:
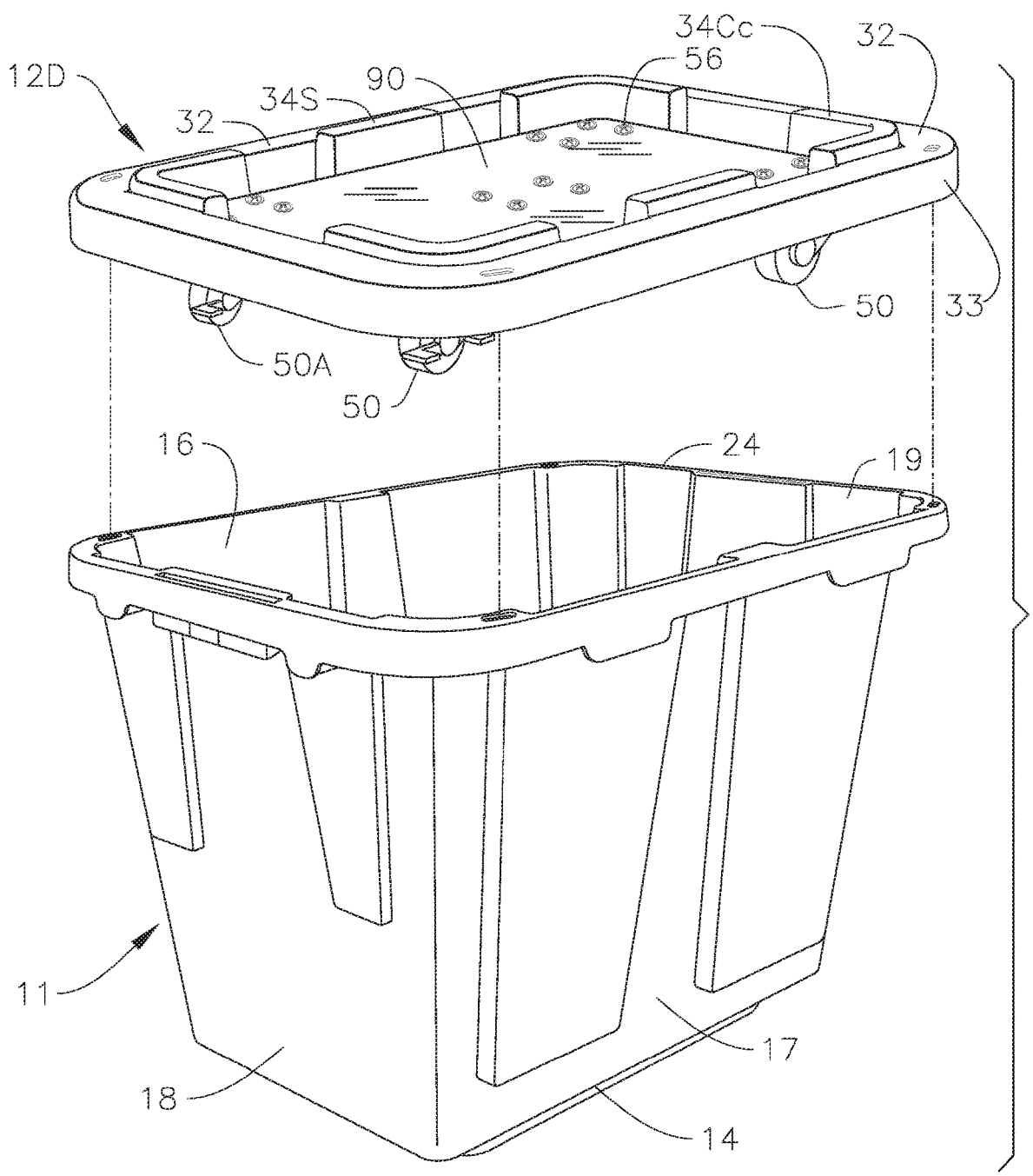
FIG. 7B is the assembled storage device kit of FIG. 7B.

The casters 50 may be removed from the lid dolly at any time as desired by the user, but notably the casters when they remain mounted on the main portion 30 of the lid dolly do not prevent the lid dolly from being used as a lid for the container 10. That is, the casters do not prevent the lid dolly from being placed back on top of the container to enclose the storage container interior volume V. Notably, where the casters are mounted on the main portion 30 which is inside of and surrounded by the peripheral portion 32 of the lid dolly, the casters are inset from the outer peripheral portion 32 of the lid, as shown in FIG. 7B, and therefore do not interfere with the engagement of the outer peripheral portion 32 and the upper edges 24 of the storage container when the lid is closed on the storage container.

In some embodiments, a kit K for a storage device 10 includes a storage container 10, a lid 12, and casters 50 and fasteners, for example, bolts 56 and nuts 58, and may also include double-sided adhesive tapes 96, as shown in FIG. 7A. In some embodiments, the kit also includes a template 90. In some embodiments, the kit further includes shims 95 and 95P. In some embodiments, the kit K further includes a set of written assembly instructions 98.

In some embodiments, a retrofit kit RK converting a lid into a lid dolly includes casters 50, fasteners, for example, bolts 56 and nuts 58, and one or more templates 90A, 90B and/or 90C, as shown in FIG. 8. In some embodiments, the retrofit kit also includes shims 95 and 95P. In some embodiments, the retrofit kit RK further includes a set of instructions 98.

In any embodiment herein, the plurality of casters may be varied, as desired or appropriate. Casters in the corner regions of the main portion 30 provide greater stability but casters may be mounted anywhere on the lid, and may avoid the peripheral portion 32 where it is desired that the lid dolly can function as a lid that engages with the upper edges 24 of the container. In some embodiments, the plurality of casters can range between about three and eight. With three casters, two casters may be in corner regions at one end and one caster in a mid region at the other end. With eight casters, four casters may be in corner regions at both ends and another four casters in mid regions along each side of the lid. An additional center caster can be added to any embodiment.

In the preceding description, for the purposes of explanation, numerous specific details are set forth to provide a thorough understanding of various embodiments. It is apparent, however, that various embodiments may be practiced without these specific details or with one or more equivalent arrangements.

Variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. Thus, the regions illustrated in the drawings are schematic in nature and their shapes are not intended to illustrate the actual shape of a region of a device and are not intended to be limiting.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A retrofit kit for a storage device with a lid and a container, the lid having an upperside and a lowerside, the upperside having raised opposing side stabilizers and raised opposing end stabilizers that define a surface area therebetween extending from one raised opposing side stabilizer to another raised opposing side stabilizer in a first direction and from one raised opposing end stabilizer to another raised opposing end stabilizer in a second direction generally perpendicular to the first direction, comprising:
   a plurality of casters, each with a respective wheel and a respective top plate, the top plate configured for attachment to the lowerside of the lid;
   a generally rectangular template configured for fixation to the upperside of the lid, the template having a sheet construction configured to extend across the surface area of the lid between the raised opposing end stabilizers in the first direction and between the raised opposing side stabilizers in the second direction as a reinforcement plate for the lid in the entirety of the surface area against a load, the template having markers for indicating attachment positions of the plurality of casters by the respective top plates to the lid, at least one marker being located in a respective corner of the generally rectangular template to indicate attachment position of the top plate of a respective caster; and
   a plurality of fasteners configured to fasten the lid between the template and the respective top plate of each caster, each respective top plate configured to be fastened to a different portion of the template and the lid.

2. The retrofit kit of claim 1, wherein each marker is configured as a through-hole and each through-hole is configured to receive a respective fastener.

3. The retrofit kit of claim 1, wherein the template includes four sets of markers, each set of markers being located in a respective corner of the generally rectangular template to indicate attachment position of the top plate of a respective caster.

4. The retrofit kit of claim 1, wherein the template includes four corners, and a first set of markers located in a first corner, a second set of markers located in a second corner, a third set of markers located in a third corner, and a fourth set of markers located in a fourth corner.

5. The retrofit kit of claim 4, wherein the template includes a fifth set of marker located in a center region of the template.

6. The retrofit kit of claim 1, further comprising printed assembly instructions.

7. A retrofit kit for a storage device with a lid and a container, the lid having an upperside and a lowerside, the upperside having raised opposing side stabilizers and raised opposing end stabilizers that define a surface area therebetween extending from one raised opposing side stabilizer to another raised opposing side stabilizer in a first direction and from one raised opposing end stabilizer to another raised opposing end stabilizer in a second direction generally perpendicular to the first direction, comprising:
   a plurality of casters, each with a respective wheel and a respective top plate, the top plate configured for attachment to the lowerside of the lid;
   a generally rectangular template configured for fixation to the lowerside of the lid, the template having a sheet construction configured to extend below the surface area of the lid between the raised opposing end stabilizers in the first direction and between the raised opposing side stabilizers in the second direction as a structural reinforcement plate for the lid against a load, the template having markers for indicating attachment positions of the plurality of casters by the respective top plates to the lid, at least one marker being located in a respective corner of the generally rectangular template to indicate attachment position of the top plate of a respective caster; and
   a plurality of fasteners configured to fasten the template between the lid and the respective top plate of each caster, each respective top plate configured to be fastened to a different portion of the template and the lid such that the template supports the lid from the lowerside against a load on the lid.

8. The retrofit kit of claim 7, wherein each marker is configured as a through-hole and each through-hole is configured to receive a respective fastener.

9. The retrofit kit of claim 7, wherein the template includes four sets of markers, each set of markers being located in a respective corner of the generally rectangular template to indicate attachment position of the top plate of a respective caster.

10. The retrofit kit of claim 7, wherein the template includes four corners, and a first set of markers located in a first corner, a second set of markers located in a second corner, a third set of markers located in a third corner, and a fourth set of markers located in a fourth corner.

11. The retrofit kit of claim 10, wherein the template includes a fifth set of marker located in a center region of the template.

12. The retrofit kit of claim 7, further comprising printed assembly instructions.

\* \* \* \* \*